United States Patent
Erickson et al.

(10) Patent No.: US 12,008,101 B2
(45) Date of Patent: Jun. 11, 2024

(54) SECURE ENABLEMENT OF A REMOVABLE SECURITY MODULE ON A LOGIC BOARD

(71) Applicant: International Business Machines Corporation, Armonk, NY (US)

(72) Inventors: Steven Charles Erickson, Rochester, MN (US); Clinton William Erie, Adams, MN (US); Shawn Matthew Johnston, Rochester, MN (US); Michael John MacPherson, Elgin, MN (US); Ryan Paske, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 17/353,935

(22) Filed: Jun. 22, 2021

(65) Prior Publication Data
US 2022/0405387 A1   Dec. 22, 2022

(51) Int. Cl.
*G06F 21/55*   (2013.01)

(52) U.S. Cl.
CPC ...... *G06F 21/554* (2013.01); *G06F 2221/034* (2013.01)

(58) Field of Classification Search
CPC .......................... G06F 21/554; G06F 2221/034
See application file for complete search history.

(56) References Cited

U.S. PATENT DOCUMENTS

| | | | |
|---|---|---|---|
| 5,880,523 A * | 3/1999 | Candelore | G06F 21/86 257/691 |
| 7,490,250 B2 | 2/2009 | Cromer et al. | |
| 8,245,053 B2 | 8/2012 | Hoang et al. | |
| 8,281,388 B1 * | 10/2012 | Sobel | G06F 21/78 726/16 |
| 9,075,927 B2 | 7/2015 | Gundam et al. | |
| 9,818,004 B1 * | 11/2017 | Rezayee | G06K 7/0095 |
| 10,496,854 B1 * | 12/2019 | Lillestolen | H05K 1/165 |
| 10,909,247 B2 | 2/2021 | Tang et al. | |
| 2002/0171546 A1 * | 11/2002 | Evans | G06F 21/554 340/568.1 |
| 2008/0148415 A1 * | 6/2008 | Kirschner | G07B 17/00314 726/35 |

(Continued)

FOREIGN PATENT DOCUMENTS

CN   109426736 A   3/2019

OTHER PUBLICATIONS

Zhang et al., "A portable TPM based on USB key." Proceedings of the 17th ACM conference on computer and communications security. Oct. 2010. p. 750-752. (Year: 2010).*

*Primary Examiner* — Carl G Colin
*Assistant Examiner* — Zhe Liu
(74) *Attorney, Agent, or Firm* — CANTOR COLBURN LLP; Tihon Poltavets

(57) ABSTRACT

Methods and systems for protecting a secure computing system. Aspects include connecting a pluggable security card to a motherboard of the secure computing system. Aspects also include activating a detection circuit to monitor a physical connection between the pluggable security card and the motherboard. Based on detecting that the physical connection between the pluggable security card and the motherboard has been interrupted, aspects include setting a tamper event flag, wherein the secure computing system is prevented from being operated when the tamper event flag is set.

11 Claims, 6 Drawing Sheets

(56) References Cited

U.S. PATENT DOCUMENTS

| | | | |
|---|---|---|---|
| 2009/0083372 A1* | 3/2009 | Teppler | H04L 9/3297 380/277 |
| 2009/0319782 A1* | 12/2009 | Lee | G06F 21/34 713/172 |
| 2011/0093693 A1 | 4/2011 | Ibrahim et al. | |
| 2011/0187532 A1* | 8/2011 | Edelstein | G08B 13/1418 340/571 |
| 2013/0067534 A1* | 3/2013 | Soffer | G06F 3/0227 726/34 |
| 2018/0307863 A1 | 10/2018 | Jackson et al. | |
| 2019/0149341 A1* | 5/2019 | Robison | H04L 9/0897 713/156 |
| 2019/0318133 A1* | 10/2019 | Lulic | H04L 9/0894 |
| 2019/0391817 A1 | 12/2019 | Seiler et al. | |
| 2021/0149823 A1* | 5/2021 | Palmer | G06F 21/72 |

\* cited by examiner

SECURE ENABLEMENT OF A REMOVABLE SECURITY MODULE ON A LOGIC BOARD

BACKGROUND

The present invention generally relates to securing computing systems, and more specifically, to secure enablement of a removable security module on a logic board.

Security modules, such as a Trusted Platform Module (TPM), are dedicated microcontrollers designed to secure hardware through integrated cryptographic keys. Security models are often utilized by secure processors and are provisioned with security keys to make it usable in a specific serialized device/system. Security modules may be permanently attached (via solder) or made pluggable depending on the needs of the product design. Permanently attaching the security module makes monitoring more difficult as it may require the addition of soldered wires or other special probes to monitor the signals and removal/replacement of the security module would be more difficult and require additional skills and tooling. Accordingly, it is intentionally difficult to remove the security module after it is soldered to the motherboard.

SUMMARY

Embodiments of the present invention are directed to a computer-implemented method for protecting a secure computing system. A non-limiting example of the computer-implemented method includes connecting a pluggable security card to a motherboard of the secure computing system. The method also includes activating a detection circuit to monitor a physical connection between the pluggable security card and the motherboard. Based on detecting that the physical connection between the pluggable security card and the motherboard has been interrupted, the method includes setting a tamper event flag, wherein the secure computing system is prevented from being operated when the tamper event flag is set.

Embodiments of the present invention are directed to a secure computing system. A non-limiting example of the secure computing system includes a motherboard, a pluggable security card removably affixed to the motherboard via a physical connection, and a detection circuit configured to monitor a continuity of physical connection. The secure computing system also includes a processor communicatively coupled to the detection circuit, the processor configured to prevent operation of the secure computing system based on the detection circuit indicating a loss of the continuity of physical connection.

Embodiments of the present invention are directed to a secure computing system. A non-limiting example of the secure computing system includes a processor configured to prevent operation of the secure computing system based on a determination that a tamper event flag is set. The secure computing system also includes a microcontroller configured to monitor a continuity of a physical connection between a motherboard of the secure computing system and a pluggable security card removably affixed to the motherboard. The microcontroller is further configured to set the tamper event flag based on detecting a loss of the continuity of physical connection.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As discussed above, security modules are often permanently attached to a motherboard to ensure that communication between the security module and the system cannot be monitored without detection and that the security module cannot be removed and replaced in an unsecure environment. While soldering the security module to the motherboard ensures the security of the computing system containing the security module, it often presents issues in the manufacturing process. For example, if an order is canceled after a computing system has been configured and tested or if an order is modified after the security module has been customized, the security module may need to have latent keys or other security data removed before it can be used again.

Turning now to an overview of the aspects of the invention, one or more embodiments of the invention address the above-described shortcomings of the prior art by providing a secure enablement of a pluggable security card having a security module, such as a TPM. In exemplary embodiments, a pluggable security card is removably affixed to a backplane or motherboard and the presence of the pluggable security card is monitored by a detection circuit, which is configured to detect if the pluggable security card is removed from the backplane or motherboard. In one embodiment, the detection circuit monitors an electrical continuity of the connection between the motherboard and the pluggable security card. In one embodiment, if the pluggable security card is removed the backplane or motherboard, booting/operation of the system is prevented until the system administrator acknowledged the condition and certain procedures were completed to restore use of the system.

In exemplary embodiments, programming of security module, or TPM, while it is not connected to the backplane or motherboard, i.e., outside of the secure computing system, allows manufacturing of the secure computing system to be more flexible. For example, when the secure computing system has to be dismantled, the pluggable security card can be replaced or reprogrammed, rather than replacing a comparatively much more expensive backplane. In applications where reprogramming is allowed, the reprogramming can be done in a controlled, secure environment using tools only the manufacturer has access to.

Figure 1:
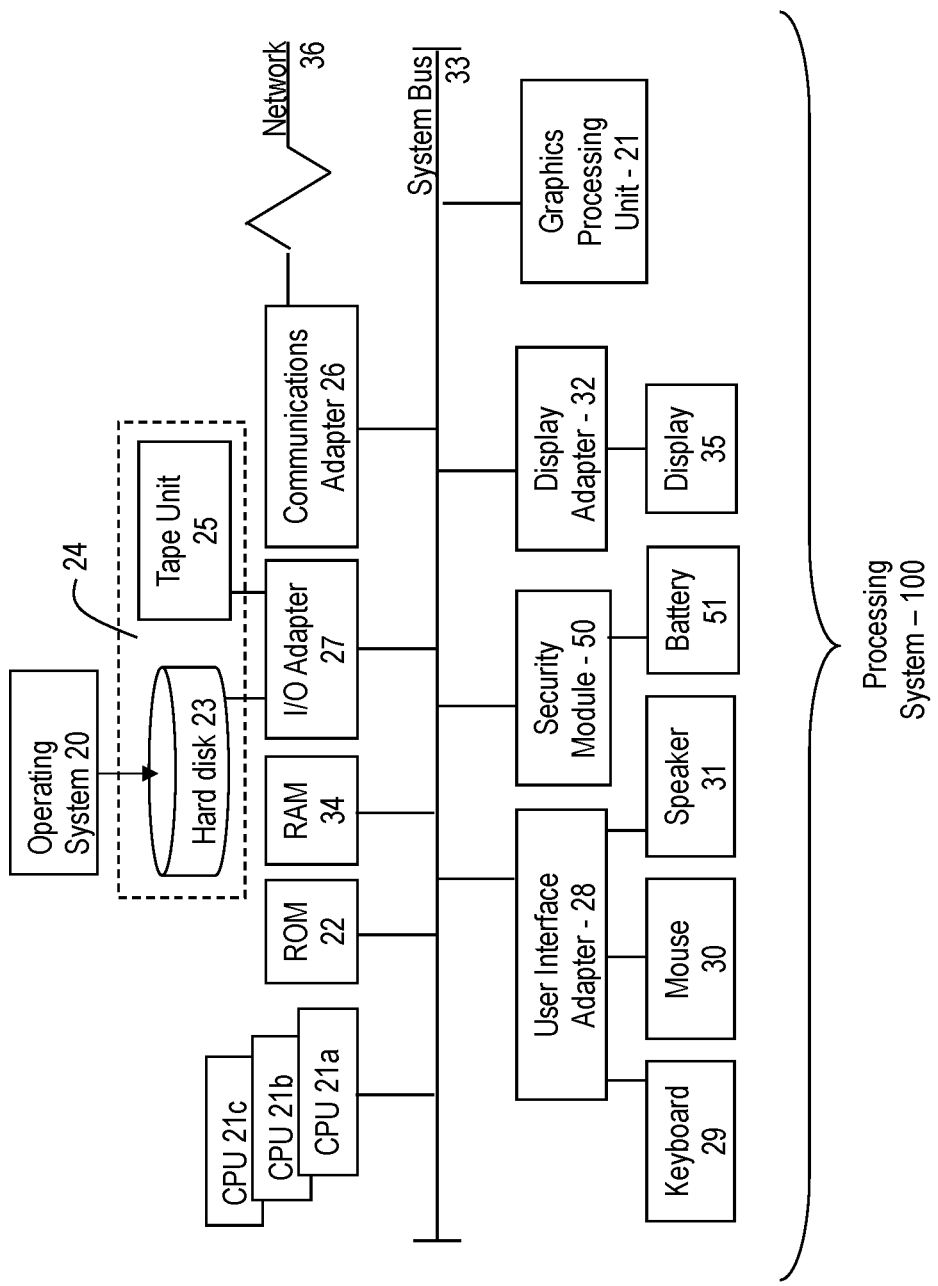
FIG. 1 depicts a block diagram of a computer system for use in implementing one or more embodiments of the invention.

Referring to FIG. 1, there is shown an embodiment of a processing system 100 for implementing the teachings herein. In this embodiment, the system 100 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 100.

FIG. 1 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 1.

In exemplary embodiments, the processing system 100 is a secure processing system that includes a security module 50. The security module 50 is disposed on pluggable security card that can be easily removed from the processing system 100. The processing system 100 also includes a battery 51 that is configured to provide power to a detection circuit that monitors the presence of the security module 50.

Figure 2:
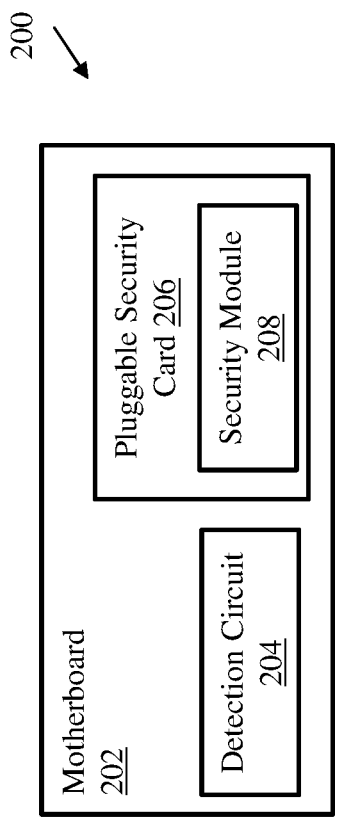
FIG. 2 depicts a block diagram of a secure computing system in accordance with an embodiment of the invention.

Referring now to FIG. 2, a block diagram of a secure computing system 200 in accordance with an embodiment is shown. As illustrated, the secure computing system 200 includes a motherboard 202 which includes a detection circuit 204. The secure computing system 200 also includes a pluggable security card 206 that can be easily removed from the secure processing system 200. The pluggable security card 206 includes a security module 208, such as a TPM. In exemplary embodiments, the detection circuit 204 is configured to continuously monitor the presence of the pluggable security card 206/security module 208 in the motherboard 204. The detection circuit 204 includes an energy storage device, such as a capacitor, super-capacitor, or battery, that allows the detection circuit 204 to monitor the presence of the pluggable security card 206/security module 208 in the motherboard 204 when the secure computing system 200 is not connected to an external power supply. In one embodiment, the detection circuit 204 includes rising-edge detection on a connector between the motherboard 202 and the pluggable security card 206. Based on detecting that the pluggable security card 206/security module 208 has been removed from the motherboard 402, the detection circuit 204 is configured to prevent booting/operation of the secure computing system 200 until a system administrator acknowledges the condition and certain procedures are completed to restore use of the secure computing system 200.

In exemplary embodiments, the detection circuit 204 is configured to detect tamper conditions even when secure computing system 200 is powered off. For example, if the security module 208 is tampered with while the secure computing system 200 is down for maintenance or during shipment to the customer. In one embodiment, a tamper detection event will not be evident to the individual tampering with the pluggable security card 206/security module 208 but will be detected by the secure computing system 200 once there is any attempt to power it on, even if the pluggable security card 206/security module 208 is re-installed as it was prior to the tampering event.

Figure 3B:
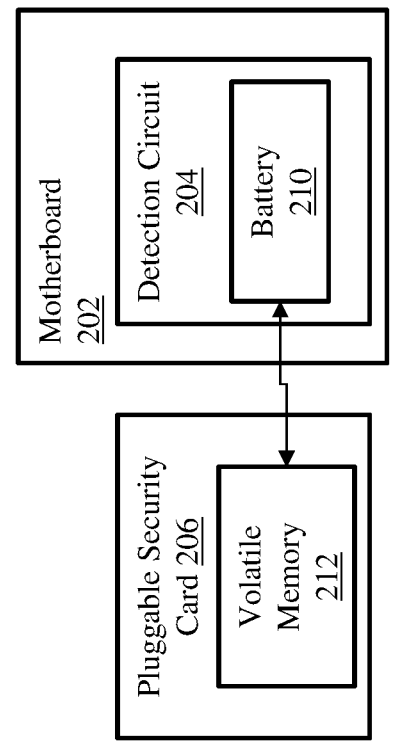
FIGS. 3A, 3B, 3C and 3D depict block diagrams of secure computing systems in accordance with various embodiments of the invention.
Figure 3A:
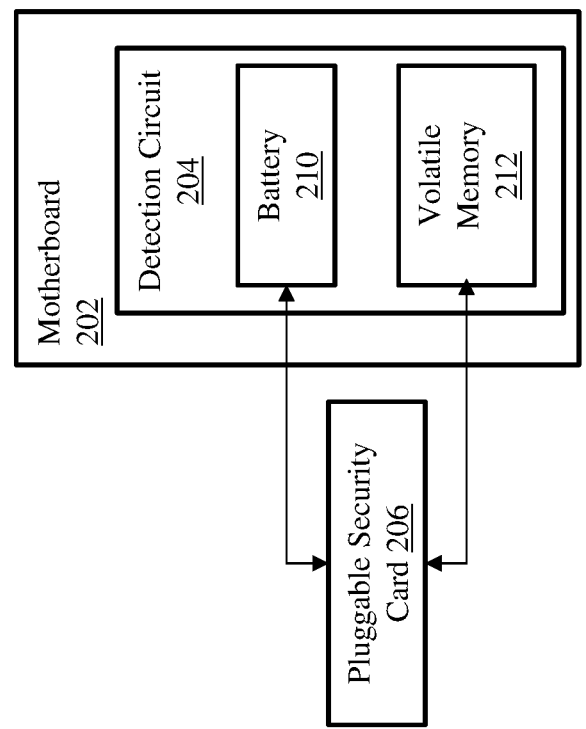

Referring now to FIGS. 3A-3D, block diagrams of exemplary embodiments of the secure computing system 200 are shown. As illustrated, the motherboard 202 includes a detection circuit 204 that is configured to detect when the pluggable security card 206 is removed from the motherboard 204. In one embodiment, as shown in FIG. 3A, the detection circuit 204 includes a battery 210 that is connected to a volatile memory 212 via an electrical connection through the pluggable security card 206. In this embodiment, the volatile memory 212 is configured with a preset value that is checked by a processor each time the secure computing system is operated. If the pluggable security card 206 is removed from the motherboard 202, the volatile memory 212 will be erased and a tamper detection event will be triggered by the processor of the secure computing system. In another embodiment, as shown in FIG. 3B, the volatile memory 212 is disposed on the pluggable security card 206 and the contents of the volatile memory 212 will be erased upon the pluggable security card 206 being removed from the motherboard 202.

Figure 3C:
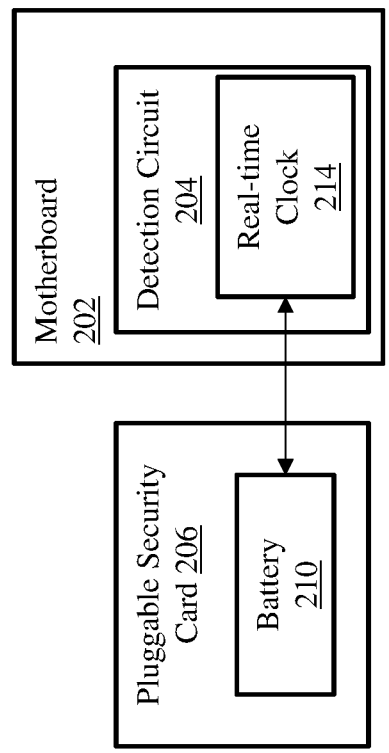
Figure 3D:
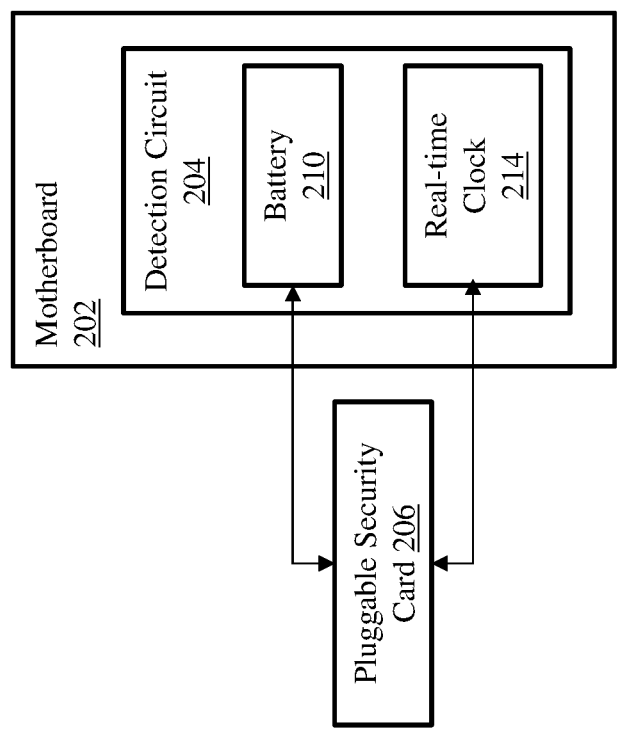

In another embodiment, as shown in FIG. 3C, the detection circuit 204 includes a battery 210 that is connected to a real-time clock (RTC) 214 via an electrical connection through the pluggable security card 206. In this embodiment, removing the pluggable security card 206 results in power-loss to the RTC 214, which causes the RTC to reset and triggers a tampering event detection by the secure computing system. A real-time clock is a widely used electronic component that consumes very low power and is used for time-keeping. RTCs are widely available and have a low cost, small form factor and very low power consumption (nano-amps). In exemplary embodiments, the RTC 214 is configured to have a default, or reset, start-time that is configurable by the manufacture of the secure computing system. In exemplary embodiments, the reset start-time is set to a time several years in the past, e.g., Jan. 1, 2000 for example). In exemplary embodiments, the time of the RTC 214 that is checked by a processor each time the secure computing system is operated. If the time provided by the RTC 214 is prior to a threshold time set by the manufacture of the secure computing system a tamper detection event will be triggered by the processor of the secure computing system. In another embodiment, as shown in FIG. 3D, the battery 210 is disposed on the pluggable security card 206 and the RTC 214 is disposed on the detection circuit and the RTC 214 will be reset upon the pluggable security card 206 being removed from the motherboard 202. As will be appreciated by those of ordinary skill in the art, other configurations of the detection circuit 204 are possible and the embodiments disclosed herein are not intended to be limiting in any way.

Figure 4:
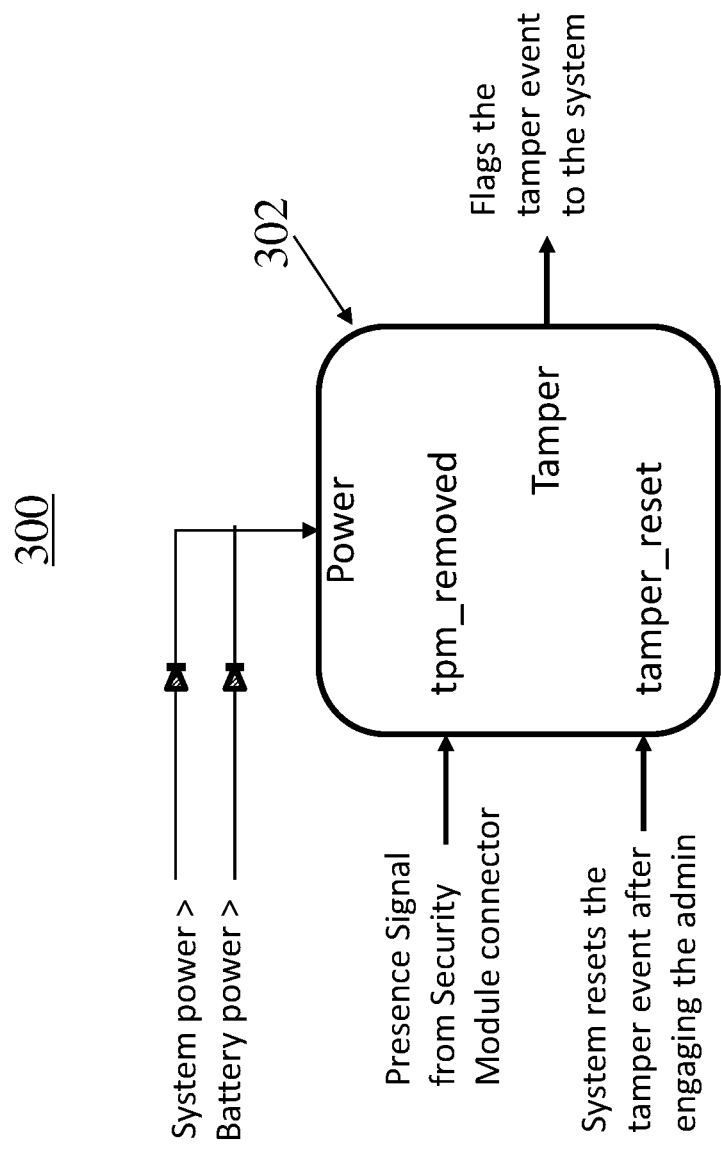
FIG. 4 depicts a schematic diagram of a detection circuit according to one or more embodiments of the invention.

Referring now to FIG. 4 a schematic diagram of a detection circuit 300 in accordance with an embodiment is shown. In this embodiment, the detection circuit 300 is implemented with a low-power microcontroller 302. As illustrated, the microcontroller 302 is shown receiving power from the secure computing system and from a battery when the secure computing system is powered-off In one embodiment, the following is programmed into the microcontroller 302 and used to perform the monitoring function:

```
main( )
{
  tamper = true; // default to true when power first applied or when power is removed/reapplied
    while (true) // loop forever
    {
      if (tpm_removed) tamper = true;
      if (tamper_reset) tamper = false;
    }
}
```

Using this code, the microcontroller 302 will detect the removal of the pluggable security card and provide an input to allow the secure computing system to reset the tamper condition once it is remedied.

Figure 5:
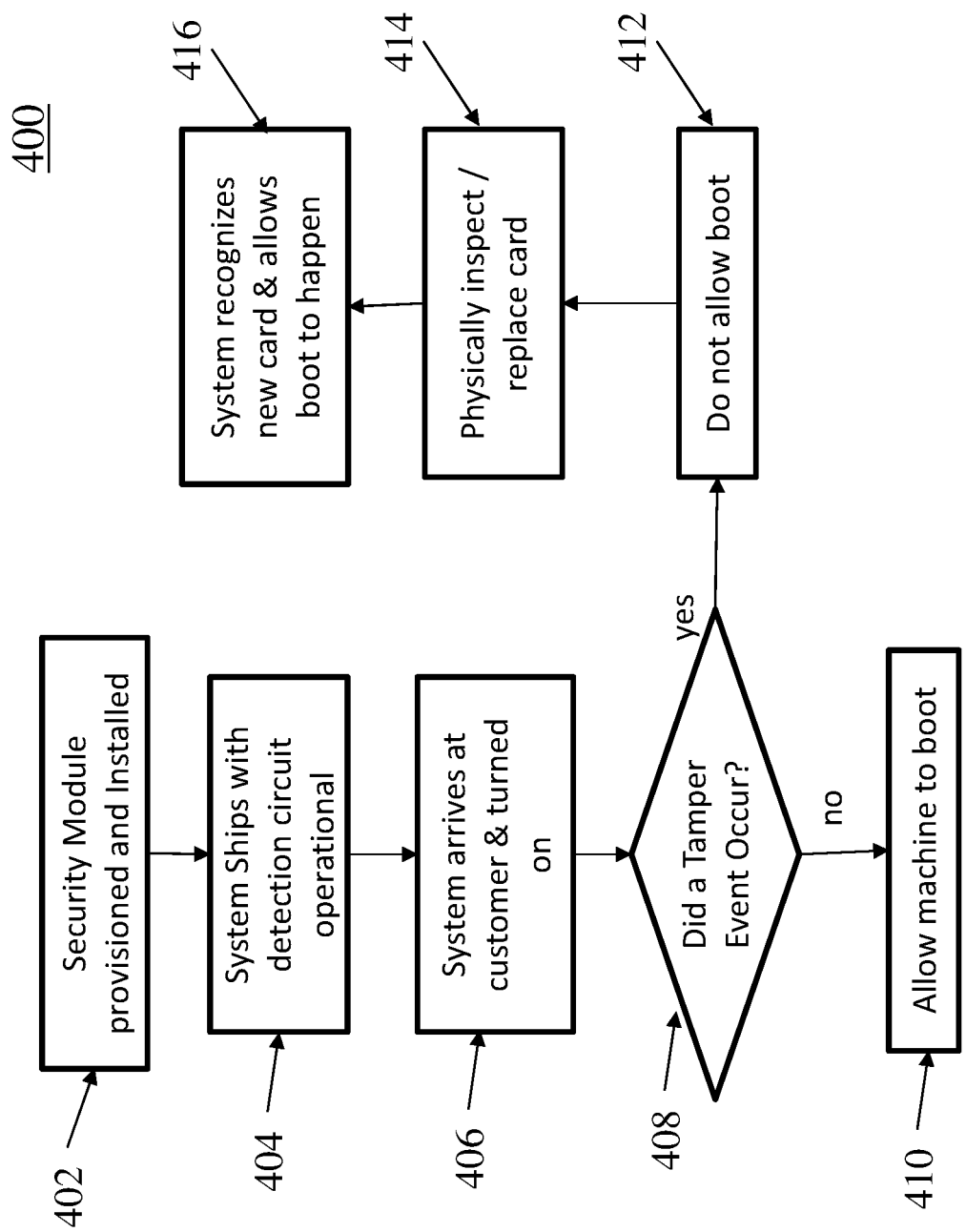
FIG. 5 depicts a flow diagram of a method for operating a secure computing system according to one or more embodiments of the invention.

Referring now to FIG. 5, a flow diagram of a method 400 for operating a secure computing system according to one or more embodiments of the invention is shown. The method 400 includes provisioning and installing a security module in a secure computing system, as shown at block 402. Next, as shown at block 404, the method 400 includes shipping the secure computing system with the detection circuit in operation. At block 406, the method 400 includes the secure computing system arriving at a customer location and being turned on. Next, as shown at decision block 408, the method 400 includes determining if a tamper event occurred. If a tamper event did not occur, the method 400 proceeds to block 410 and the secure computing system is allowed to boot up. Otherwise, the method 400 process to block 412 and the secure computing system is prevented from booting up. Next, as shown at block 414, the method 400 includes performing a physical inspection of the secure computing system including the pluggable security card, and optional replacement of the pluggable security card. The method 400 concludes at block 416 with the secure computing system booting up after the secure computing system recognizes as new pluggable security card.

Figure 6:
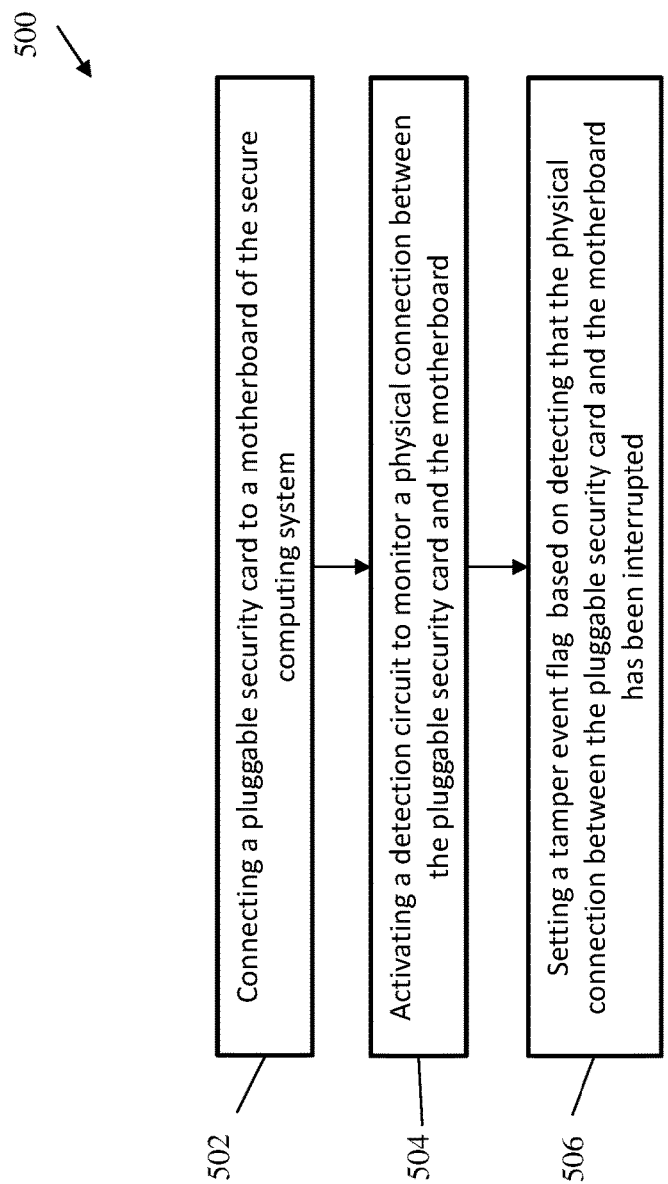
FIG. 6 depicts a flow diagram of a method for protecting a secure computing system according to one or more embodiments of the invention.

Referring now to FIG. 6, a flow diagram of a method 500 for protecting a secure computing system according to one or more embodiments of the invention is shown. As shown at block 502, the method 500 includes connecting a pluggable security card to a motherboard of the secure computing system. Next, as shown at block 504, the method 500 includes activating a detection circuit to monitor a physical connection between the pluggable security card and the motherboard. The method 500 also includes setting a tamper event flag based on detecting that the physical connection between the pluggable security card and the motherboard has been interrupted, as shown at block 506. In exemplary embodiments, the secure computing system is prevented from being operated when the tamper event flag is set. In exemplary embodiments, the pluggable security card includes a security module.

In one embodiment, the detection circuit includes an energy storage device and a volatile memory that are electrically connected via the physical connection between the pluggable security card and the motherboard. In one embodiment, one or more of the energy storage device and the volatile memory are disposed on the motherboard. In another embodiment, one or more of the energy storage device and the volatile memory are disposed on the pluggable security card.

In one embodiment, the detection circuit includes an energy storage device and a real-time clock that are electrically connected via the physical connection between the pluggable security card and the motherboard. In one embodiment, one or more of the energy storage device and the real-time clock are disposed on the motherboard. In another embodiment, one or more of the energy storage device and the real-time clock are disposed on the pluggable security card.

Additional processes may also be included. It should be understood that the processes depicted in FIGS. 5 and 6 represent illustrations, and that other processes may be added, or existing processes may be removed, modified, or rearranged without departing from the scope and spirit of the present disclosure.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for protecting a secure computing system, the method comprising:
   connecting a pluggable security card having a trusted platform module (TPM) designed to secure the secure computing system using integrated cryptographic keys, to a motherboard of the secure computing system,
   activating a detection circuit to monitor a physical connection between the pluggable security card and the motherboard;
   based on detecting that the physical connection between the pluggable security card and the motherboard has been interrupted, setting a tamper event flag,
   wherein the secure computing system is prevented from being operated when the tamper event flag is set,
   wherein the detection circuit is disposed on the motherboard, the detection circuit includes a battery and a volatile memory, and wherein connecting the pluggable security card establishes an electrical connection between the battery and the volatile memory through the pluggable security card, and
   wherein a loss of the electrical connection will result in erasure of the volatile memory.

2. The computer-implemented method of claim 1, wherein the detection circuit further includes a real-time clock that is electrically connected via the physical connection between the pluggable security card and the motherboard.

3. The computer-implemented method of claim 2, wherein the real-time clock is disposed on the motherboard.

4. The computer-implemented method of claim 2, wherein the real-time clock is disposed on the pluggable security card.

5. A secure computing system comprising:
   a motherboard;
   a pluggable security card having a trusted platform module (TPM) designed to secure the secure computing system using integrated cryptographic keys, the pluggable security card being removably affixed to the motherboard via a physical connection;
   a detection circuit configured to monitor a continuity of physical connection, wherein the detection circuit is disposed on the motherboard, the detection circuit includes a battery and a volatile memory, and the pluggable security card establishes an electrical connection between the battery and the volatile memory through the pluggable security card; and
   a processor communicatively coupled to the detection circuit, the processor configured to prevent operation of the secure computing system based on the detection circuit indicating a loss of the continuity of physical connection,
   wherein a loss of the electrical connection will result in erasure of the volatile memory.

6. The secure computing system of claim 5, wherein the pluggable security card includes a security module.

7. The secure computing system of claim 5, wherein the detection circuit includes a real-time clock that is electrically connected via the physical connection between the pluggable security card and the motherboard.

8. The secure computing system of claim 7, wherein the real-time clock is disposed on the motherboard.

9. The secure computing system of claim 7, wherein the real-time clock is disposed on the pluggable security card.

10. A secure computing system comprising:
    a processor configured to prevent operation of the secure computing system based on a determination that a tamper event flag is set;
    a microcontroller configured to monitor a continuity of a physical connection between a motherboard of the secure computing system and a pluggable security card having a trusted platform module (TPM) designed to secure the secure computing system using integrated cryptographic keys, the pluggable security card being removably affixed to the motherboard, wherein the motherboard includes a detection circuit comprising a battery and a volatile memory and wherein the pluggable security card establishes an electrical connection between the battery and the volatile memory through the pluggable security card, wherein the microcontroller is further configured to set the tamper event flag based on detecting a loss of the continuity of physical connection, wherein a loss of the electrical connection will result in erasure of the volatile memory.

11. The secure computing system of claim 10, wherein the pluggable security card includes a security module.

* * * * *